United States Patent [19]
Taylor

[11] 3,947,004
[45] Mar. 30, 1976

[54] LIQUID SPRING, VEHICLE SUSPENSION SYSTEM AND METHOD FOR PRODUCING A LOW VARIANCE IN NATURAL FREQUENCY OVER A PREDETERMINED LOAD RANGE

[75] Inventor: Douglas P. Taylor, Grand Island, N.Y.

[73] Assignee: Tayco Developments, Inc., North Tonawanda, N.Y.

[22] Filed: Dec. 23, 1974

[21] Appl. No.: 535,349

[52] U.S. Cl. .............................................. 267/65 R
[51] Int. Cl.² ............................................. F16F 5/00
[58] Field of Search .... 267/65 R, 65 A, 64 R, 64 A, 267/113

[56] References Cited
UNITED STATES PATENTS

| | | | |
|---|---|---|---|
| 2,873,963 | 2/1959 | Taylor | 267/64 A |
| 2,909,368 | 10/1959 | Taylor | 267/64 A |
| 3,218,051 | 11/1965 | Doetsch | 267/65 R |

*Primary Examiner*—James B. Marbert
*Attorney, Agent, or Firm*—Joseph P. Gastel

[57] ABSTRACT

A method of obtaining a low variance in suspension frequency of an object including the steps of establishing the natural frequency which is desired, calculating the varying spring rate required to maintain the desired suspension frequency throughout a predetermined load range, selecting a compressible fluid having a varying rate of compressibility which approaches the desired calculated varying spring rate, and utilizing a spring constructed with said compressible fluid to support said object. A vehicle suspension system comprising in combination a vehicle body for functioning over a predetermined load range and a spring suspension having a low variance in natural frequency over said predetermined load range comprising a housing, a piston in said housing, a compressible fluid having a varying compressibility in said housing with the rate of change of the compressibility of the compressible fluid being matched to a varying spring rate which will produce said low variance. A liquid spring including a housing, piston means in said housing, and liquid means in said housing having a predetermined varying spring rate which will produce a predetermined natural frequency range over a predetermined load range.

11 Claims, 9 Drawing Figures

NATURAL FREQUENCY OF SUSPENSION OSCILLATION VS. VEHICLE WEIGHT WITH A CONVENTIONAL CONSTANT RATE SPRING.

NOTE:
1) SPRING RATE = 20 X LB./FT.
2) EQUATION IS $\omega_N = \sqrt{K/M}$
3) TOTAL FREQUENCY VARIANCE GROSS TO EMPTY, IS 2.24

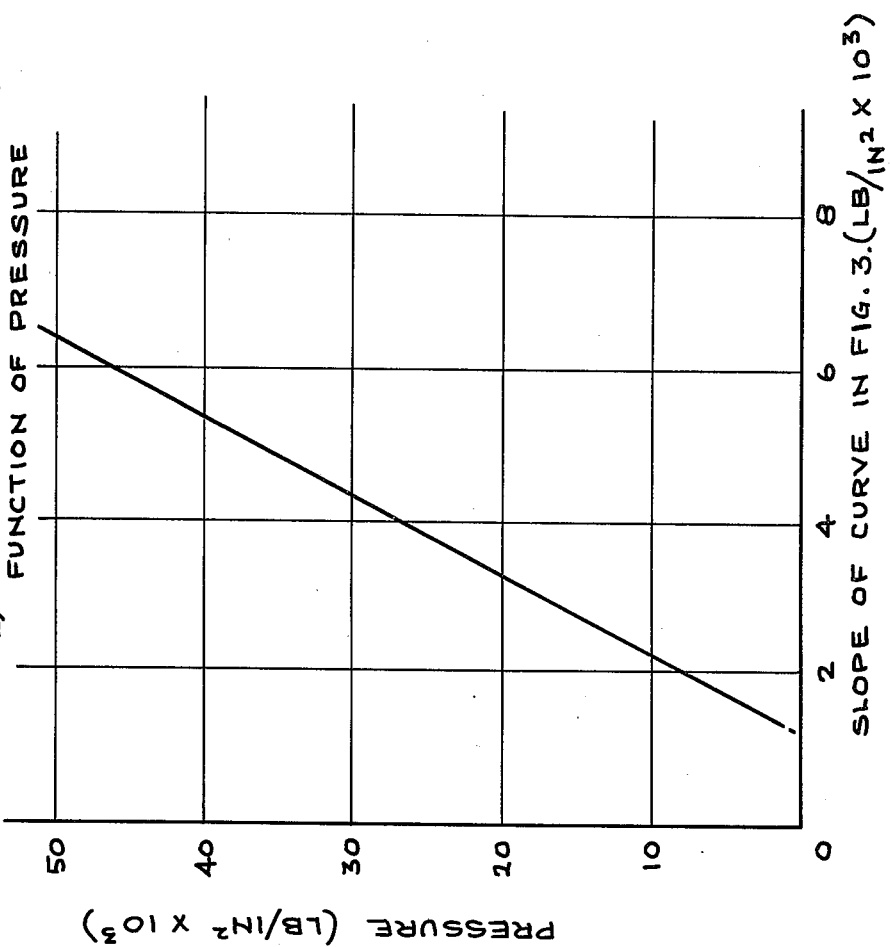
Fig. 4. CURVE SLOPE OF FIG. 3. (% CHANGE OF COMPRESSION) VS. PRESSURE
NOTE:
1) CURVE SLOPE VARIANCE IS 4.92
2) CURVE AS PLOTTED IS A LINEAR FUNCTION OF PRESSURE
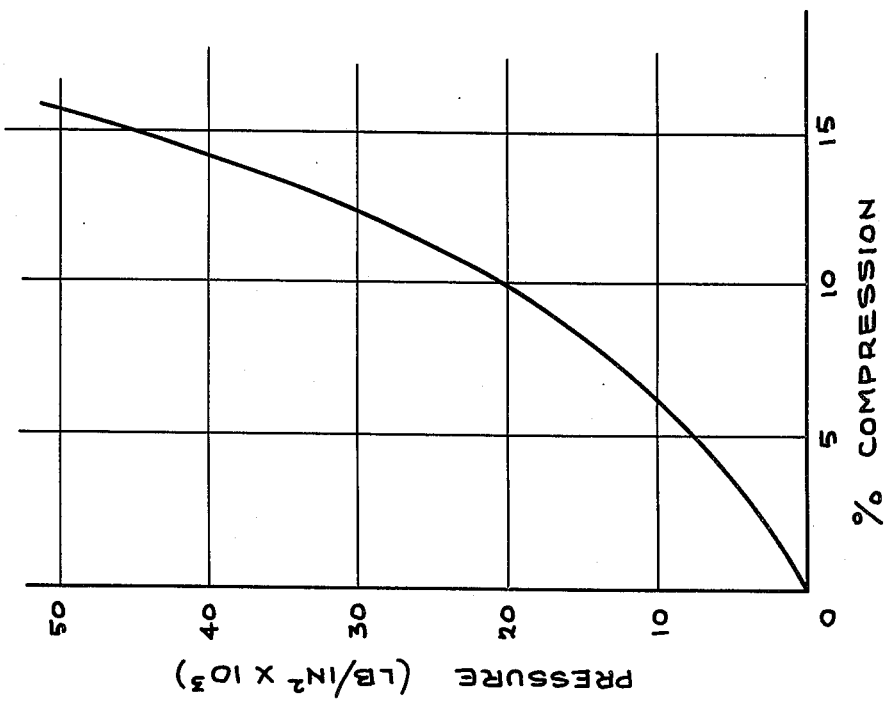
Fig. 3. SILICONE OIL COMPRESSIBILITY CURVE
NOTE: CURVE SLOPE VARIANCE AS PLOTTED IS 4.92

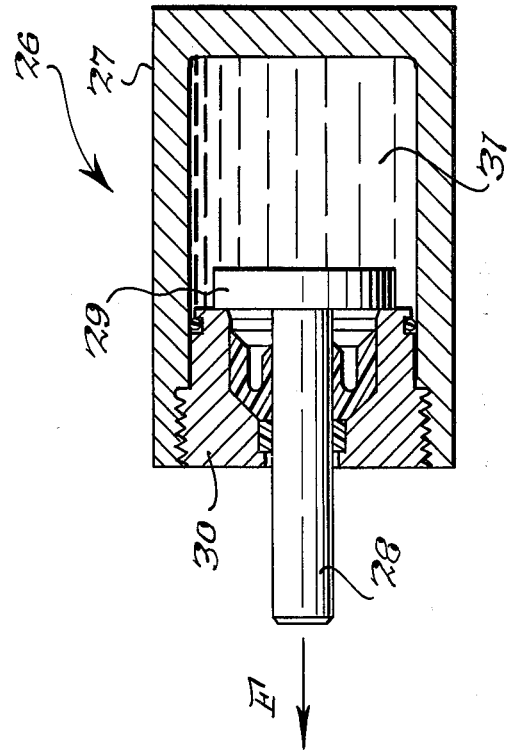
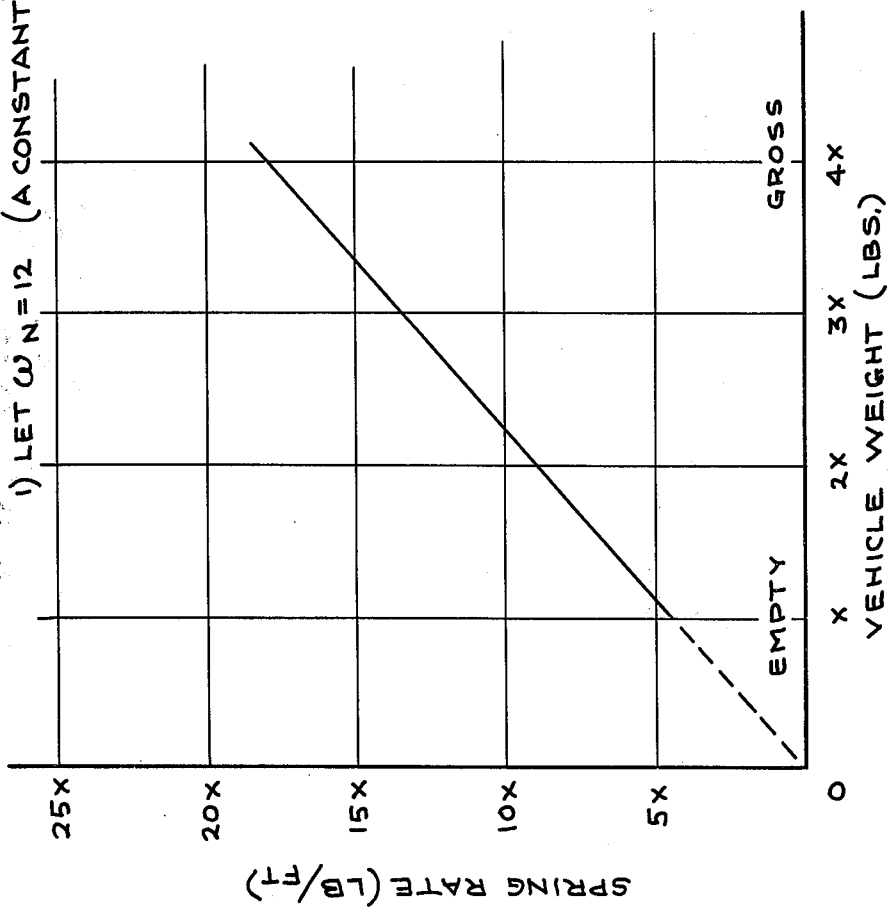

LIQUID SPRING, VEHICLE SUSPENSION SYSTEM AND METHOD FOR PRODUCING A LOW VARIANCE IN NATURAL FREQUENCY OVER A PREDETERMINED LOAD RANGE

The present invention relates to an improved liquid spring and to an improved method and system for suspending a body, such as a vehicle, by a spring construction to produce a low variance in natural frequency.

By way of background, trucks, cranes, crawlers and other types of load-carrying vehicles, which are increasingly important to the productivity of industry, are constantly being designed for more capacity, greater speed and lighter weight. However, these vehicles are generally being built with constant spring rate suspension systems which include coil springs, leaf springs, and hydropneumatic springs. However, these types of springs do not work adequately over the total vehicle load spectrum of empty to full load because they utilize spring designs which possess a constant spring rate which allows the vehicle's natural frequency of suspension oscillation to vary by an extremely large factor. Thus, if the vehicle produces an acceptable ride at full load, it will produce too harsh a ride when empty. Conversely, if the vehicle produces an acceptable ride when empty, the ride will be too soft at full load. In short, there is no commercially feasible way of producing a low variance in suspension frequency of a vehicle throughout its load range.

It is accordingly one important object of the present invention to provide an improved method of producing a low variance in suspension frequency over substantially the entire load range of an object, such as a vehicle. A related object of the present invention is to provide an improved method of achieving the foregoing by the use of compressible fluids.

Another object of the present invention is to provide an improved vehicle spring suspension which is capable of producing a low variance in suspension frequency by utlizing a compressible fluid having a varying compression rate.

A further object of the present invention is to provide an improved liquid spring having a predetermined variable spring rate. Other objects and attendant advantages of the present invention will readily be perceived hereafter.

The improved method of the present invention is directed to the obtaining of a low variance in suspension frequency of an object comprising the steps of establishing the constant natural frequency which is desired, calculating the varying spring rate required to maintain the desired suspension frequency throughout a predetermined load range, selecting spring means having a varying spring rate which approaches said calculated varying spring rate, and utilizing said spring means for suspending said object. In its more specific aspects, the improved method of the present invention utilizes spring means containing a compressible fluid or a plurality of compressible fluids to produce the varying spring rate.

The present invention also relates to a vehicle suspension system comprising in combination a vehicle body for functioning over a predetermined load range and a spring suspension having a low variance in natural frequency over said predetermined load range comprising a housing, piston means in said housing, compressible fluid means having a varying rate of compressibility in said housing, with the rate of change of the compressibility of said compressible fluid means being matched with a varying spring rate which will produce a low variance in said natural frequency. In its more specific aspects, the compressible fluid means comprises a plurality of different fluids in said housing.

The present invention also relates to a liquid spring comprising a housing, piston means in said housing, and liquid means in said housing having a predetermined varying spring rate which will produce a predetermined natural frequency range over a predetermined load range. The various aspects of the present invention will be more fully understood when the following portions of the specification are read in conjunction with the accompanying drawings wherein:

FIG. 3 is a compressibility curve for silicone oil showing the percent compression versus the applied pressure;

FIG. 4 is a graph showing the slope of the curve of FIG. 3 at each pressure;

FIG. 5 is a graph showing the spring rate required to maintain a constant frequency of oscillation for varying vehicle weight;

FIG. 6 is a view, partially in cross section, showing the construction of one form of liquid spring which may be utilized in apparatus for practicing the method of the present invention;

Figure 1:
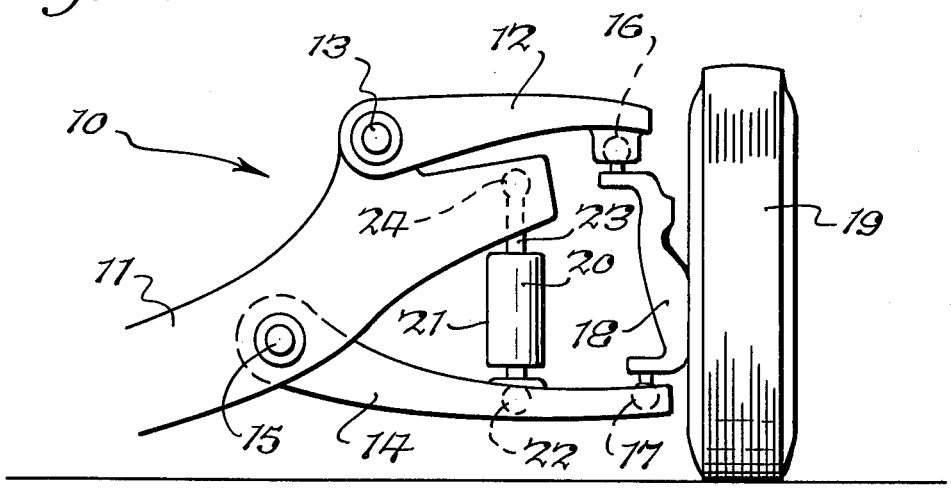
FIG. 1 is a fragmentary view showing liquid spring means utilized in a vehicle wheel suspension.

Broadly, the vehicle suspension 10 includes a vehicle body having a frame 11, an upper arm 12 pivoted to the frame at 13, and a lower arm 14 is pivoted to the frame at 15. Suitable connections 16 and 17 are provided between arms 12 and 14, respectively, and member 18 on which vehicle wheel 19 is mounted. A liquid spring 20 includes a housing 21 and a lower portion 22 attached to arm 14. The piston 23 associated with spring 20 is coupled to frame 11 at 24. It will be appreciated that the spring 20 thus controls the action of arms 12 and 14 in response to varying forces applied to wheel 19.

Figure 2:
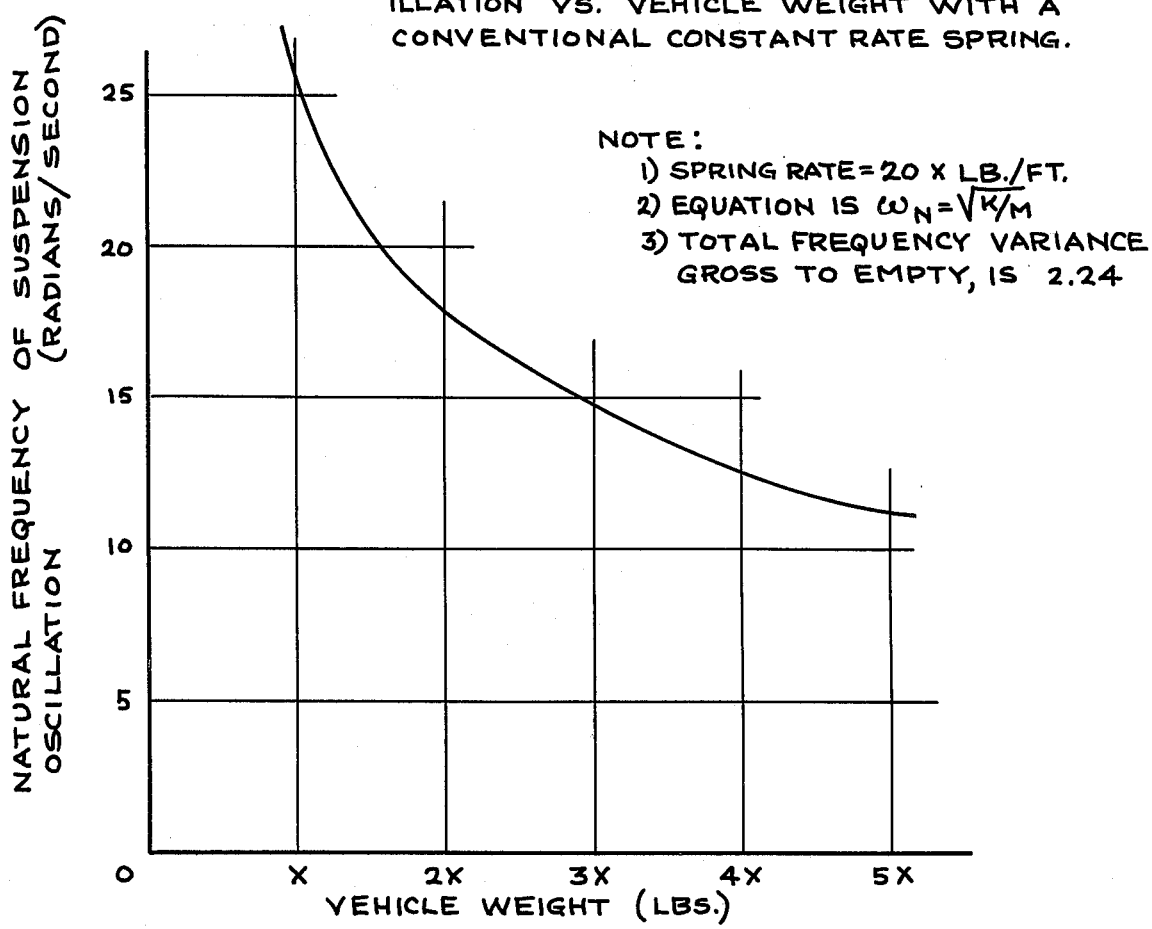
FIG. 2 is a graph illustrating the relationship between the natural frequency of suspension versus vehicle weight when a constant rate spring is utilized for the suspension.

By way of background, the natural frequency of a suspension is given by the formula $$\omega_N = \sqrt{\frac{K}{M}}$$

where $\omega_N$ equals the natural frequency in radians per second, K equals the spring rate, and M equals the vehicle mass. As is well understood the natural frequency is a measure of how many times the suspension will oscillate per unit of time after the suspension has been deflected and is released and allowed to vibrate without the application of any external force. The foregoing relationship is depicted in FIG. 2 which is a graph showing the natural frequency of suspension oscillation in radians per second for a vehicle having a weight which varies between X and 5X and which utilizes a spring having a rate of 20X pounds per foot. From FIG. 2 it can be seen that the total frequency variance, or the ratio of the natural frequency of suspension at 5X to the natural frequency of suspension at X is 2.24. It is to be especially noted that the ride frequency thus varies by more than a factor of 2, whereas a driver of a vehicle can normally sense with discomfort a change in ride frequency of only plus or minus 15 percent. The ideal situation, therefore, is to maintain the natural frequency of the suspension substantially constant throughout the load range. For example, relative to the suspension of FIG. 2, it might be desired that the ideal natural frequency should be 10 radians/second for the ride characteristics which are desired, in which event, the ideal suspension would give a natural frequency of 10 radians/ second throughout the load range between X and 5X.

As noted immediately above, the ride frequency, or natural frequency of suspension, must be calculated for the vehicle under consideration at its various critical load points. If the ride frequency is too low, the vehicle suspension will undergo large amplitude long duration deflections after hitting a bump and will result in frequency suspension bottoming, poor handling, and driver motion sickness. On the other hand, if the ride frequency is too high, a vehicle suspension will undergo small amplitude, short duration deflections after hitting a bump, and this will result in a rough jarring ride and short vehicle life due to a fatigue of components.

If a vehicle suspension was designed with a constant spring rate so that the frequency of the suspension was ideal with the vehicle empty, an extremely soft ride would result when the vehicle was loaded because the natural frequency would be too low in the loaded mode. In other words, from FIG. 2 it can be seen that the natural frequency of suspension decreases with increasing vehicle weight and if the frequency was ideal with the vehicle empty, it would be too low when the vehicle was loaded. Conversely, if the ideal ride frequency was calculated for the fully loaded mode, there would be too stiff a ride when the vehicle was empty and this can also be visualized from FIG. 2.

As noted briefly above, under ideal conditions, the natural frequency of oscillation should remain substantially constant throughout the load range. However, as can be seen from the formula $$\omega_N = \sqrt{\frac{K}{M}}$$

the natural frequency varies inversely with the square root of the vehicle mass and directly with the spring rate. Therefore, if the spring rate should vary in the same direction as the vehicle mass, a condition could be realized where the natural frequency $\omega_N$ would remain substantially constant. FIG. 5 is a plot of this condition showing the spring rate which is required to maintain a constant frequency of oscillation with varying vehicle weights. In this particular case, the frequency of oscillation $\omega_N$ is selected at a value of 12.

In accordance with the present invention, a compressible fluid is utilized to provide a varying spring rate which approaches, and under ideal conditions would become substantially equal to, the varying spring rate required to maintain the constant frequency of oscillation depicted in FIG. 5, and this results in obtaining a lower variance in the suspension frequency than is obtainable with a constant rate spring. More specifically, it has been observed that a compressible fluid, in this instance, silicone oil, has a compressibility curve which shows that increasingly greater forces are required to compress it as it becomes more compressed. This is represented by the graph of FIG. 3. FIG. 4 is a plot of the curve slope of FIG. 3 at each point of pressure on the graph of FIG. 3. The slope is determined by measuring the slope of a tangent to each point on the curve of FIG. 3. A plot of the slope between 0 and 15 percent compression of FIG. 3 yields the straight line of FIG. 4, which shows the change in slope of the curve of FIG. 3, and this is equal to the change in rate of compressibility of the silicone oil forming the basis of the graph in FIG. 3.

A comparison of FIGS. 3, 4 and 5 shows that a change in spring rate which is necessary to obtain a constant ride frequency (FIG. 5) is broadly of the same magnitude as the slope change of silicone oil compressibility (FIG. 4) over the pressure range depicted. The matching of the slope of the line in FIG. 4 to the slope of the line in FIG. 5 can thus provide the changing spring rate which will produce a near constant natural frequency of spring oscillation throughout a predetermined load range. In other words, a predetermined changing spring rate can be used to produce a predetermined natural frequency range over a predetermined load range.

The foregoing results can be obtained with the fluid spring 26 of FIG. 6. Essentially this spring includes a cylinder 27, a piston 28, a damping piston 29, and suitable seals associated with end cap 30. A body of silicone oil 31 is contained in housing 27. In a spring of this type, the output force F is equal to the internal pressure applied to the silicone oil 31 multiplied by the effective piston area. In this respect the compression of the silicone oil (and of many other fluids, both liquid and gaseous) is a conservation process, that is, one in which energy is stored upon compression of the fluid and is available whenever the compression process is reversed. This gives a fluid spring a component equation similar to that of a mechanical spring, except that the spring rate of the fluid spring at any displacement is a function of the fluid used and the internal pressure existing on the fluid in the spring at a particular time. In this respect, for a liquid spring the output force is determined by the formula $$F = f \text{ (fluid properties, internal pressure)} X$$

where F is equal to the output force, X is the piston displacement, and the remainder of the equation constitutes a function of the fluid properties and the internal pressure of the fluid, which as noted above, vary with each particular fluid. The calculation of the force for a fluid spring at any particular piston displacement is thus more complex than the calculation of the force in a mechanical spring wherein the formula $$F = KX$$

is used wherein F equals the output force, K equals the spring rate and X equals the spring displacement.

The various function-related spring rate characteristics of the liquid spring may be utilized to obtain a more constant ride frequency by matching the fluid selection, the spring design parameters, and the vehicle ride characteristics. By way of example, FIG. 7 is a graph which was developed for a fluid spring such as shown in FIG. 6 having a piston rod area of 2 square inches, a total fluid volume of 263 cubic inches at atmospheric pressure (which is less volume in the cylinder under the preload force of 10,000 pounds), a total weight of the object when empty equal to 10,000 pounds per fluid spring, a total weight of the object when loaded equal to 40,000 pounds per fluid spring, and the support position of the piston at empty equal to 0 inches.

The foregoing data was used in conjunction with the formula $$\frac{\text{\% compression at desired piston position}}{\text{minus \% compression at preload position}} = \frac{XA}{V_T}$$

to determine the percent compression of the fluid at the desired stroke position. In the foregoing formula, the percent compression at the desired position of the piston minus the percent compression at the preload position of 10,000 pounds is equal to the measured stroke X times the area of the piston A divided by the total volume of the cylinder $V_T$. Thus since the spring used in the system of FIG. 7 is preloaded at 10,000 pounds, there would be 5,000 pounds per square inch pressure in the fluid and this would correspond to approximately 4 percent compression in the fluid at the preload position, as can be determined from FIG. 3. Therefore, the percent compression of the fluid at each position of the piston can be determined by use of the above formula which now reads $$\text{\% compression at desired piston position} - 4\% = \frac{XA}{V_T}$$

Figure 7:
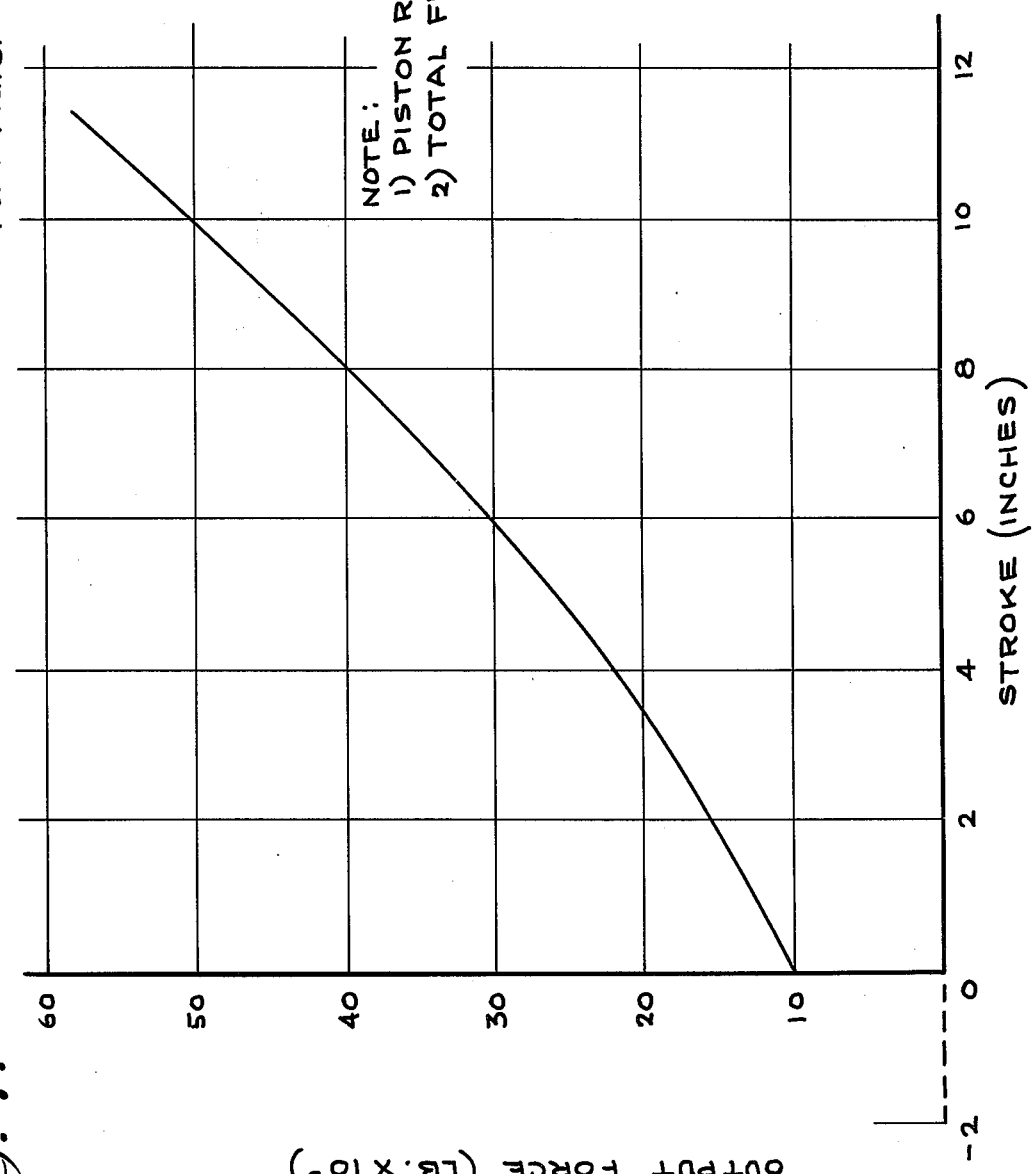
FIG. 7 is a graph showing the output force of the liquid spring of FIG. 6 plotted against the stroke of the spring using the silicone oil of FIG. 3 as the operating fluid.

In order to obtain the output force to be plotted on FIG. 7 for each position of the piston, the percent compression at the desired position which has been determined from the above formula is calculated and then from FIG. 3, the pressure in pounds per square inch is found for the corresponding calculated percent compression, and then the piston area is multiplied by this value to give the total force at each position of the piston. When all of these points are plotted, the curve of FIG. 7 is obtained. By way of example, for a piston storke of 2 inches, the formula would read $$\text{\% compression at 2 inch position} - 4\% = \frac{2 \times 2}{263}$$

This would give a value for the percent compression of 5.53 percent. Therefore, from a value of 5.53 percent in FIG. 3, a fluid pressure of about 7,800 pounds per square inch is obtained, and therefore the total force on the piston is 15,600 pounds.

The following table sets forth the spring rate of the spring of FIG. 6 at 1 inch stroke increments, and this is obtained by the slope of the curve of FIG. 7 at such increments.

| Stroke in inches | Force in pounds | Spring rate lb./in. |
|---|---|---|
| (−1) | (7,400) | |
| 0 | 10,000 | 2,580 |
| 1 | 12,560 | 2,800 |
| 2 | 15,600 | 3,070 |
| 3 | 18,700 | 3,300 |
| 4 | 22,200 | 3,700 |
| 5 | 26,100 | 4,050 |
| 6 | 30,300 | 4,370 |
| 7 | 34,840 | 4,590 |
| 8 | 39,480 | 4,880 |
| 9 | 44,500 | 5,290 |
| 10 | 50,060 | 5,800 |
| 11 | 56,100 | |

Total rate variance = 2.15

In the foregoing respect, the spring rate at any given stroke position is equivalent to the value of the slope of the curve of FIG. 7 at the corresponding output force. More specifically, the slope at each point on the curve of FIG. 7 is the rate of change of the output force, and this is the same as the rate of change of the fluid spring because the output force is merely the spring rate multiplied by a constant, namely, the piston area. Therefore, utilizing the spring rate at any given stroke position, the natural frequency of the suspension for each such position may be obtained by inserting the spring rate from the above table into the formula $$\omega_N = \sqrt{\frac{K}{M}}$$

Figure 8:
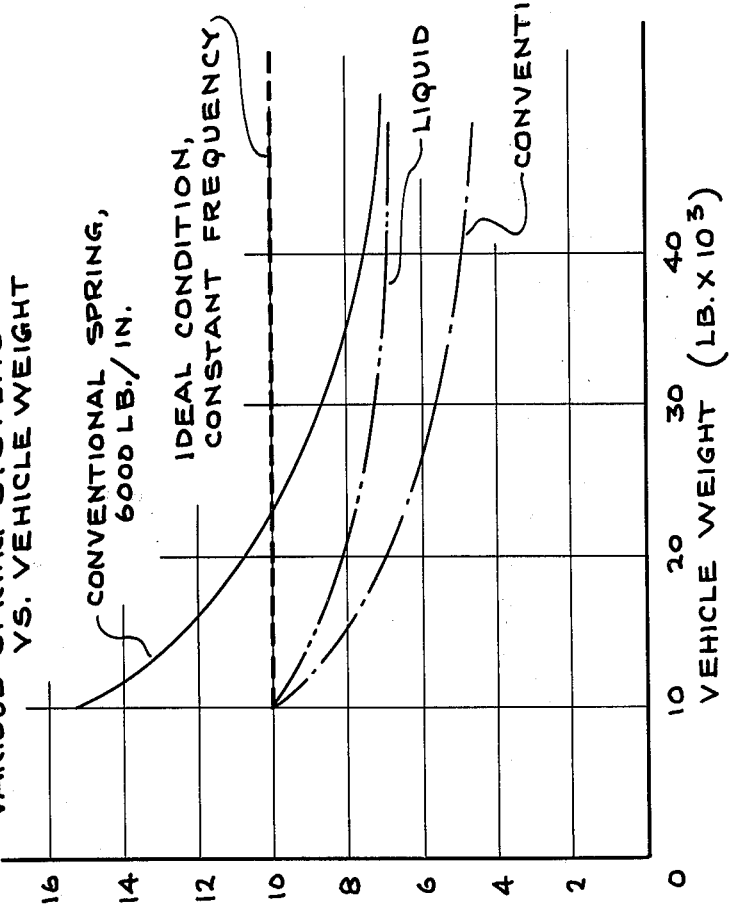
FIG. 8 is a graph plotting the natural frequency of suspension oscillation for various spring systems versus vehicle weight.

FIG. 8 plots the natural frequency of a system against the vehicle weight. The ideal desired natural frequency for the truck is selected at 10 and is shown by a horizontal dotted line on FIG. 8. The liquid spring of FIG. 6 provides a line which is reasonably close to the ideal line and this line is obtained from a calculation of the data in the above table utilizing the natural frequency equation. FIG. 8 also includes a graph showing the natural frequency under the loading conditions of FIG. 8 utilizing a conventional spring having a rate of 6,000 pounds per inch and also a conventional spring having a rate of 2,500 pounds per inch.

From an analysis of FIG. 8 it can be seen that the liquid spring of FIG. 6 is set for the ideal frequency at empty weight and this ideal frequency is selected in radians per second. At full load of 40,000 pounds, the liquid spring of FIG. 6 has deviated from the ideal condition line of 10 by 3.1 radians per second. The 2,500 pounds per inch conventional spring was also set for the ideal condition of 10 radians per second at the empty vehicle weight of 10,000 pounds. At full load of 40,000 pounds, this spring has deviated from the ideal by 5.0 radians per second. The 6,000 pounds per inch conventional spring was set to be roughly equivalent to the ride of the liquid spring at the full load condition. However, its total deviation from empty vehicle weight of 10,000 pounds to full load vehicle load of 40,000 pounds is 8.0 radians per second. It can thus be seen that the liquid spring of FIG. 6 provides a relatively low deviation from the ideal, and thus this spring has a predetermined varying spring rate which will produce a predetermined natural frequency range over a predetermined load range. Thus, the liquid spring is superior to the constant rate coil springs by 161 6 to 258 percent.

By the selection of a compressible fluid medium with a more radical percent compression slope change than discussed above for the liquid spring, it would be possible to obtain nearly 0 deviation in natural ride frequency.

Instead of selecting a single compressible fluid, as discussed above relative to FIG. 6, a mixture of compressible fluids can be used to give the desired curve slope (such as shown in FIG. 4), to be matched with the desired spring rate (such as shown in FIG. 5). In this respect, for example, silicone oil having a viscosity of 10 centistokes or greater has a 9.4 percent compression at 20,000 psi. A silicone oil having a viscosity of under 6.5 centistokes has a 12.1 percent compression at 20,000 psi. By mixing such silicone oils in the proper proportion, a desired percent compression and related composite compression-curve slope may be obtained for the purpose of matching any desired rate of change curve. At this point it must again by emphasized that it is the rate of change of compressibility which is the controlling factor in matching a fluid medium to a desired change of spring rate. Thus various fluids may be mixed in any desired proportion to give the desired rate of change of slope for obtaining the desired change in spring rate.

The liquids which may be used may be miscible, as in the case of silicone oils, or immiscible. In either event they are merely mixed with each other to obtain the desired ultimate characteristics. Typical other liquids which may be used, by way of example and not of limitation, are glycerin, freon-base oils, and water.

Figure 9:
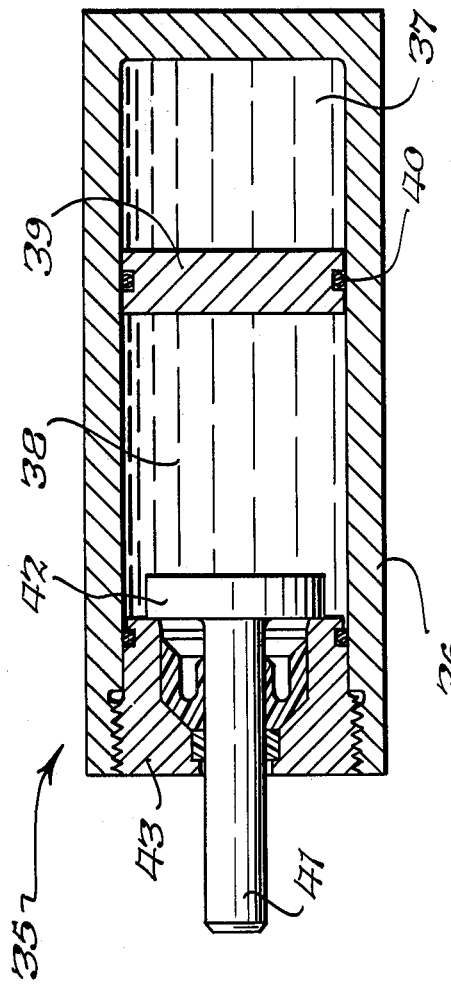
FIG. 9 is a view, partially in cross section, showing another form of liquid spring which may be utilized to practice the method of the present invention.

If for any reason it is not desired to mix the two or more compressible oils or media, they can be utilized in a liquid spring 35 such as shown in FIG. 9 wherein a housing 36 is divided into chambers 37 and 38 by means of a floating piston 39 mounting a suitable seal 40 to maintain the fluids 37 and 38 separated. A piston 41 having a damping piston 42 mounted thereon is suitably supported in end cap 42 having the proper seals (not numbered). It will be appreciated that as piston 41 moves into liquid 38, the force of the spring will be a function of the compressibility of liquids 37 and 38. It will be appreciated that by the proper design of the area of piston 39 and by the proper selection of the liquids 37 and 38 and by the proper selection of the desired number of liquids in spring 35, the desired output characteristics may be obtained. In the latter respect, it will be appreciated that more than two liquids 37 and 38 may be used by dividing housing 36 into any desired number of chambers by using any desired number of floating pistons such as 39. In addition, by varying the effective area of opposite faces of the piston, such as 39, a further modified spring characteristic may be obtained.

It will also be appreciated that if a plurality of immiscible fluids are used, a floating piston, such as 39, is not needed, provided that each fluid is independently compatible with the various seals which are used. In a case where one fluid is compatible with the seals in the end cap 43 and the other is not, the incompatible fluid can be located in the chamber to the right of floating piston 39.

It will be appreciated that by the selective combining of a plurality of compressible fluids having different rates of compression, any desired curve slope, such as shown in FIG 4, may be obtained to match any desired change in spring rate. Furthermore, as noted above, two or more fluids can be combined and such fluids may be liquids or gases or combinations of both.

In addition, the fluids for the springs may be selected in such a manner as to provide a predetermined minimum height variance of the vehicle between its empty condition and full load. The liquid spring construction of the present invention is manifestly suitable for such an arrangement because of its varying rate, that is, it will tend to compress lesser distances with greater loads and thus there will be a less vehicle height variation throughout the load range as compared to a spring which has a constant rate.

While preferred embodiments of the present invention have been disclosed, it will be appreciated that the present invention is not limited thereto but may be otherwise embodied within the scope of the following claims.

What is claimed is:

1. A method of obtaining a low variance in suspension frequency of an object comprising the steps of establishing the constant natural frequency which is desired, calculating the varying spring rate required to maintain the desired suspension frequency throughout a predetermined load range, selecting spring means having a varying spring rate which approaches the said calculated varying spring rate, and utilizing said spring means for supporting said object.

2. A method as set forth in claim 1 wherein said spring means comprises a compressible fluid.

3. A method as set forth in claim 1 wherein said spring means comprises a plurality of compressible fluids.

4. A method as set forth in claim 3 wherein said plurality of compressible fluids are mixed with each other.

5. A vehicle suspension system comprising in combination a vehicle body for functioning over a predetermined load range and a suspension having a low variance in natural frequency over said predetermined load range comprising housing means, piston means in said housing means, and compressible fluid means having a varying compressibility in said housing means with the rate of change of the compressibility of said compressible fluid means being matched to a varying spring rate which will produce a low variance in said natural frequency.

6. A vehicle suspension system as set forth in claim 5 wherein said compressible fluid means comprises a plurality of different fluids.

7. A vehicle suspension system as set forth in claim 6 wherein said plurality of fluids are separated into different chambers in said housing.

8. A liquid spring for producing a low variance in natural frequency over a predetermined load range comprising housing means, piston means in said housing means, and liquid means in said housing means having a predetermined varying spring rate which will produce a predetermined natural frequency range over a predetermined load range.

9. A liquid spring as set forth in claim 8 wherein said liquid means comprises a plurality of different liquids.

10. A liquid spring as set forth in claim 9 wherein said liquids are mixed with each other.

11. A liquid spring as set forth in claim 9 including a plurality of chambers in said housing, and wherein each of said chambers contains a different liquid.

* * * * *